US012798163B2

(12) United States Patent

Xu et al.

(10) Patent No.: US 12,798,163 B2
(45) Date of Patent: Nov. 17, 2026

(54) MOLD, MOLDING SYSTEM AND MOLDING METHOD FOR HIGH STRETCHING OF IN-MOLD DECORATIVE FILM

(71) Applicant: ZHEJIANG UNIVERSITY, Hangzhou (CN)

(72) Inventors: Zhongbin Xu, Hangzhou (CN); Yi Liu, Hangzhou (CN); Nanyang Zhao, Hangzhou (CN); Fangzhou Li, Hangzhou (CN); Peihui Ding, Hangzhou (CN); Jing Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 21 days.

(21) Appl. No.: 18/766,639

(22) Filed: Jul. 8, 2024

(65) Prior Publication Data

US 2025/0100193 A1 Mar. 27, 2025

(30) Foreign Application Priority Data

Sep. 27, 2023 (CN) ........................ 202311260348.X

(51) Int. Cl.
*B29C 45/14* (2006.01)
*B29C 45/78* (2006.01)

(52) U.S. Cl.
CPC .. *B29C 45/14262* (2013.01); *B29C 45/14008* (2013.01); *B29C 45/78* (2013.01); *B29C 2045/14213* (2013.01); *B29C 2045/14286* (2013.01); *B29C 2045/14868* (2013.01); *B29C 2945/76006* (2013.01); *B29C 2945/7604* (2013.01); *B29C 2945/76301* (2013.01); *B29C 2945/76347* (2013.01); *B29C 2945/76531* (2013.01); *B29C 2945/76779* (2013.01); *B29C 2945/76826* (2013.01)

(58) Field of Classification Search
None
See application file for complete search history.

(56) References Cited

FOREIGN PATENT DOCUMENTS

CN 106042269 A 10/2016
CN 109049556 A 12/2018
(Continued)

OTHER PUBLICATIONS

Chinese Office Action mailed Dec. 23, 2025, issued in related Chinese Application No. 202311260348.X(19 pages).

*Primary Examiner* — Susan D Leong
*Assistant Examiner* — Xinwen Ye
(74) *Attorney, Agent, or Firm* — Wiersch Law Group

(57) ABSTRACT

A mold for high stretching of an in-mold decorative film, comprising an upper base, a stationary mold, a film pressing frame, a movable mold and a lower base sequentially arranged from top to bottom. The film pressing frame can move up and down; a film to be stretched is placed between the film pressing frame and the stationary mold; a cavity block is fixed in the stationary mold, the lower surface of the cavity block is provided with air holes, and the upper surface is provided with a vacuum air pumping cavity communicated with the air holes; a core block is fixed in the movable mold, and a core ejection movable block is arranged in the core block; the core ejection movable block and the movable mold are provided with a heated air inlet channel and an air outlet channel which are communicated with the outside.

4 Claims, 5 Drawing Sheets

(56) References Cited

FOREIGN PATENT DOCUMENTS

| | | | | | |
|---|---|---|---|---|---|
| DE | 102017214388 | A1 | | 2/2019 | |
| KR | 20160140339 | A | * | 12/2016 | ....... B29C 45/14688 |
| TW | 200842017 | A | * | 11/2008 | ............. B29C 45/16 |

* cited by examiner

MOLD, MOLDING SYSTEM AND MOLDING METHOD FOR HIGH STRETCHING OF IN-MOLD DECORATIVE FILM

CROSS-REFERENCE TO RELATED APPLICATIONS

The present application claims priority to Chinese Patent Application No. 202311260348. X, filed on Sep. 27, 2023, the content of which is incorporated herein by reference in its entirety.

TECHNICAL FIELD

The present disclosure relates to the field of in-mold injection molding, in particular to a product mold for high stretching of an in-mold decorative film and a molding method.

BACKGROUND

In-mold decoration or in-mold electronics is an integrated injection technology that embeds the film into the mold. There are two ways to embed the film into the mold. One is to stretch the plane film in the mold. Before stretching, the film is heated by an external heater, and then the film is stretched by vacuum adsorption on the cavity side. The height drop of the stretching depth that can be achieved is about 5 mm, and this method is mainly used for In-Mold Roller (IMR) products for in-mold decoration. The height difference that can be achieved by this method is small, which is insufficient to meet the degree of freedom of modeling surfaces. The other is that the film is heated by a heater outside the mold, then adsorbed by a special vacuum adsorption device, and finally the curved film is embedded into the mold for injection molding. A larger stretching may be obtained, with a height drop of about 10 mm and a minimum angle of 10°. This method is mainly used for Film Insert Molding (INS) and In-Mold Electronics (IME) products in in-mold decoration. This method involves many pretreatment steps, with a complicated process and a low efficiency. In order to better meet the degree of freedom of modeling surface of in-mold integrated film products, a higher drawing depth is required, and at the same time, it needs to reduce complicated processes from the perspective of production efficiency. An innovative mold design solution is urgently needed to solve this problem.

SUMMARY

In view of the shortcomings of the prior art, the present disclosure provides a product mold for high stretching of an in-mold decorative film and a molding method. In the closed-mold state, a film is heated by high-temperature and high-pressure air, a core ejection mechanism is used to carry out stretch molding, and regulation and shaping in the stretching process are carried out; the film is sequentially stretched by vacuum adsorption at the synchronous cavity side. The trinity in-mold molding technology of film heating, mechanical stretching and vacuum adsorption is adopted to realize the manufacture of high-stretching products of planar films in the mold.

The object of the present disclosure is achieved through the following technical solution:

A mold for high stretching of an in-mold decorative film. The mold includes an upper base, a stationary mold, a film pressing frame, a movable mold and a lower base which are sequentially arranged from top to bottom. The film pressing frame is capable of moving up and down, and a film to be stretched is placed between the film pressing frame and the stationary mold.

A cavity block is fixedly provided in the stationary mold, a lower surface of the cavity block is provided with air holes and an upper surface of the cavity block is provided with a vacuum air pumping cavity, and the air holes are communicated with the vacuum air pumping cavity; the stationary mold is provided with a vacuum air pumping channel communicated with the outside at a position matched with the vacuum air pumping cavity, and the vacuum air pumping cavity is communicated with a vacuum air pump outside a mold body through the vacuum air pumping channel.

A core block is fixedly provided in the movable mold, and a core ejection movable block is arranged in the core block; the core ejection movable block is capable of moving up and down, and a limit of upward movement is to keep a distance of a film thickness from the cavity block; the core ejection movable block and the movable mold are provided with heated air inlet channels communicated with the outside, and the core block and the movable mold are provided with air outlet channels communicated with the outside; the heated air inlet channel is communicated with an air outlet of a compressed air heater outside the mold body through a pipeline, and the air outlet channel is communicated with an air inlet of the compressed air heater through a pipeline.

Further, the vacuum air pumping cavity arranged at the upper surface of the cavity block is annular nested, and sequentially includes a first air pumping cavity, a second air pumping cavity and a third air pumping cavity from outside to inside; and the air holes arranged at the lower surface of the cavity block are funnel-shaped and distributed in a plurality of rings, and are communicated with the first air pumping cavity, the second air pumping cavity and the third air pumping cavity, respectively.

Further, a spiral heating wire is arranged in the heated air inlet channel, and temperature and pressure sensors are installed in both the heated air inlet channel and the air outlet channel, so that the temperature and pressure in the channel can be monitored in real time and fed back to an operation interface of an external control terminal.

Further, a top end of the core ejection movable block is in a shape of an inverted truncated cone, and the core block matched with the core ejection movable block is provided with an inverted truncated cone groove, and the air outlet channel is arranged at the inverted truncated cone of the core, so that when the core ejection movable block moves upward, a gap channel is formed between an edge of the core ejection movable block and the core block, and the gap channel is communicated with the air outlet channel.

A center of the top of the core ejection movable block is provided with a conical through hole, and an end of the heated air inlet channel matched with the core ejection movable block is conical, when the core ejection movable block moves upward, a gap channel is formed between an inner side of the core ejection movable block and a broken end of a terminal of the air heated air inlet channel, and the gap channel is communicated with the heated air inlet channel.

A molding system for high stretching of an in-mold decorative film, including a control terminal, and a mold, a compressed air heater, a vacuum air pump and an injection molding machine connected to the control terminal. The mold is the above mold for high stretching of an in-mold decorative film.

The control terminal is configured to control the compressed air heater to inject heated air into a core ejection movable block to heat, soften and preliminarily stretch a film, control the vacuum air pump to pump out air from a cavity surface of the cavity block and the film, control the movement of the mold to mechanically stretch the film, and control the injection molding machine to perform injection molding.

A molding method based on the molding system, including the following steps:

S1, preheating a movable mold and a spiral heating wire in the heated air inlet channel in the core ejection movable block to a set temperature.

S2, moving a film pressing frame upwards to be attached to a stationary mold to press the film onto the stationary mold, and moving the movable mold to be attached to the film pressing frame.

S3, eject upwards the core ejection movable block in the movable mold, and releasing high-temperature and high-pressure air in the heated air inlet channel onto the film; flowing the high-temperature and high-pressure air bounced back from the film out from a gap channel formed between an edge of the core ejection movable block and a core block, and returning to an air inlet of the compressed air heater from the air outlet channel, forming circulation at a side of the movable mold, and rapidly heating, softening and preliminarily stretching the film. The control terminal is automatically adjusted to keep a pressure difference between the heated air inlet channel and the air outlet channel.

S4, exhausting, by the vacuum air pump, the film and a cavity on the cavity surface through a vacuum air pumping channel, a vacuum air pumping cavity and an air holes in the stationary mold, and sequentially communicating a third air pumping cavity, a second air pumping cavity and a first air pumping cavity according to a set order, and gradually stretching the film.

S5, ejecting the core ejection movable block to the film, pushing the film softened by heating to a cavity surface, and mechanically stretching the film.

S6, after ejecting the core ejection movable block to a stroke limit, reserving the core ejection movable block for a set time and retreating the core ejection movable block; and keeping a whole retreating process for a set time, and adjusting, by the control terminal automatically, the pressure difference between an air inlet channel and the air outlet channel of the core, and simultaneously maintaining the vacuum air pumping at a side of the cavity.

S7, retreating the core ejection movable block into place, closing the heated air inlet channel and the air outlet channel; and closing air pumping pipelines connected to the first air pumping cavity, the second air pumping cavity and the third air pumping cavity, respectively, and starting, by the injection molding machine, injection molding.

The present disclosure has the following beneficial effects:

(1) Compared with the existing IMR mold and INS or IME mold, the product mold for high stretching of an in-mold decorative film according to the present disclosure can achieve a high degree of stretching of flat films within the mold, specifically demonstrating a high stretch with a height drop of 20 mm and an angle of 7°, which can better meet the freedom of curved surfaces of modeling, enhancing the freedom of product design and diversity.

(2) The mold and the molding method of the present disclosure heat the film circularly in the closed-mold state, effectively preventing the loss of thermal energy and significantly reducing energy consumption. Compared to traditional heating methods, this closed mold heating cycle not only improves energy efficiency but also enables more precise control of the heating process, ensuring uniform heating of the film and thereby enhancing molding quality and efficiency.

(3) The mold design of the present invention ensures that the entire stretching process occurs within the mold. This design not only reduces complex conversion processes and minimizes human intervention and errors during production but also enhances production efficiency and the stability of product quality. Additionally, the internal stretching process reduces film stretching deformation and damage, ensuring excellent product quality and appearance after molding.

Figure 1:
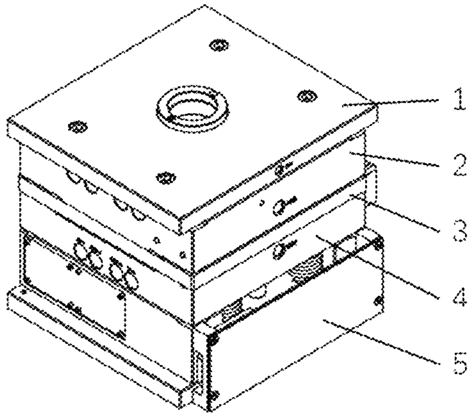
FIG. 1 is a schematic diagram of the overall structure of a product mold for high stretching of an in-mold decorative film according to an embodiment of the present disclosure.

In the figures: Upper base 1, Stationary mold 2, Cavity block 201, First air pumping channel 202, Second air pumping channel 203, Third air pumping channel 204, Film pressing frame 3, Movable mold 4, Lower base 5, Cavity block 6, First air pumping cavity 601, Second air pumping cavity 602, Third air pumping cavity 603, Cavity air hole 604, Film 7, Core block 8, Core ejection movable block 801. Air outlet channel 9. Heated air inlet channel 10, Heating wire 1001.

DESCRIPTION OF EMBODIMENTS

The object and effect of the present disclosure will become more apparent by describing the present disclosure in detail according to the attached drawings and preferred embodiments. It should be understood that the specific embodiments described here are only for explaining the present disclosure and are not used to limit the present disclosure.

As shown in FIG. 1, the product mold for high stretching of an in-mold decorative film provided by the embodiment of the present disclosure includes an upper base 1, a stationary mold 2, a film pressing frame 3, a movable mold 4 and a lower base 5 which are sequentially arranged from top to bottom. The film 7 to be stretched is placed between the film pressing frame 3 and the stationary mold 2.

Figure 2:
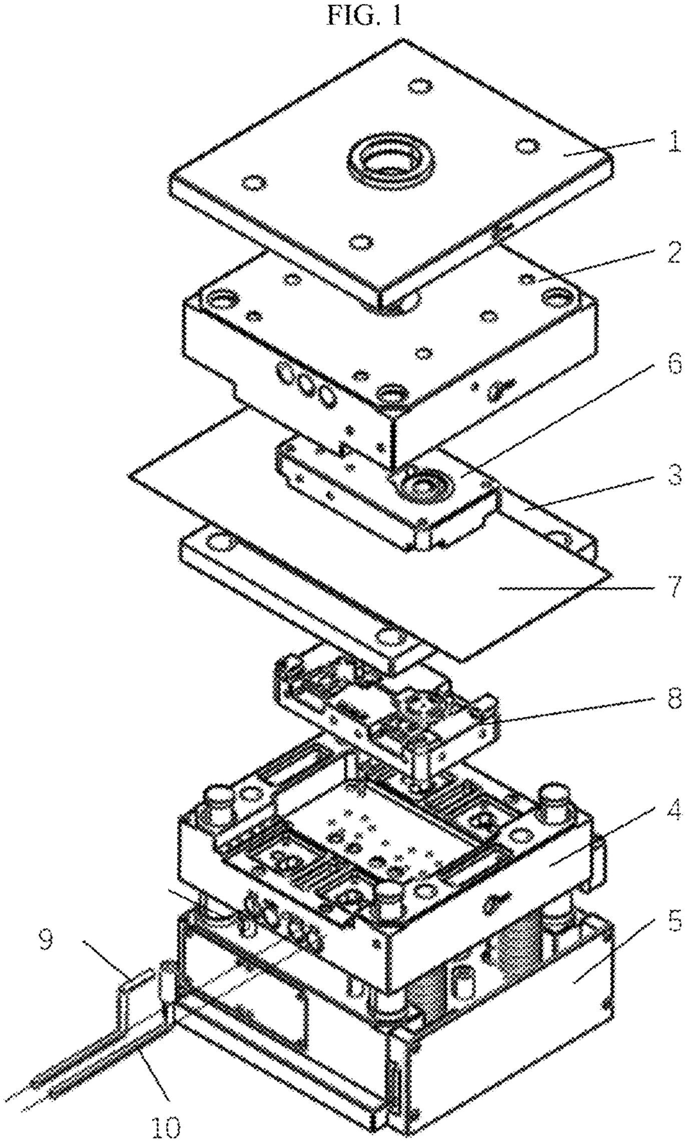
FIG. 2 is an exploded view of the mold body.
Figure 3:
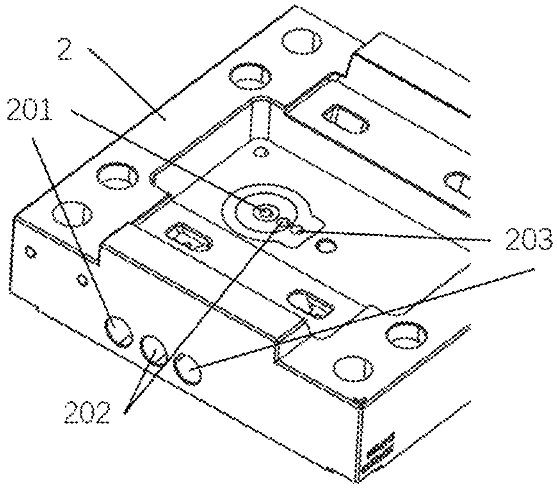
FIG. 3 is a part diagram of the stationary mold.
Figure 4:
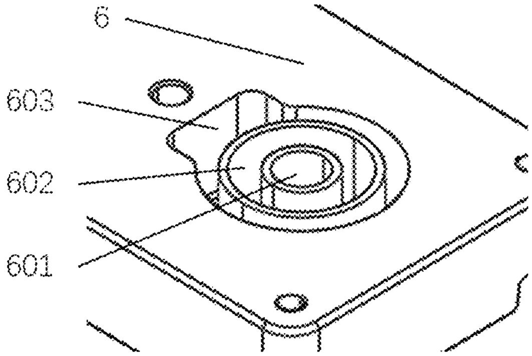
FIG. 4 is a detail view of the cavity block 6.
Figure 5:
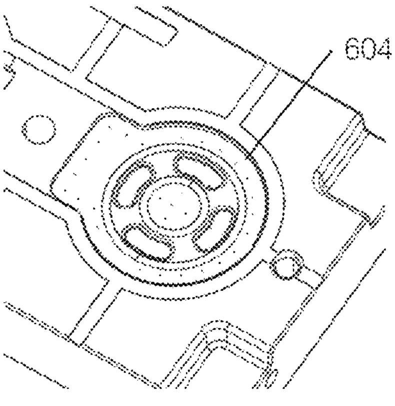
FIG. 5 is a part view of the cavity block 6 from another perspective.
Figure 9:
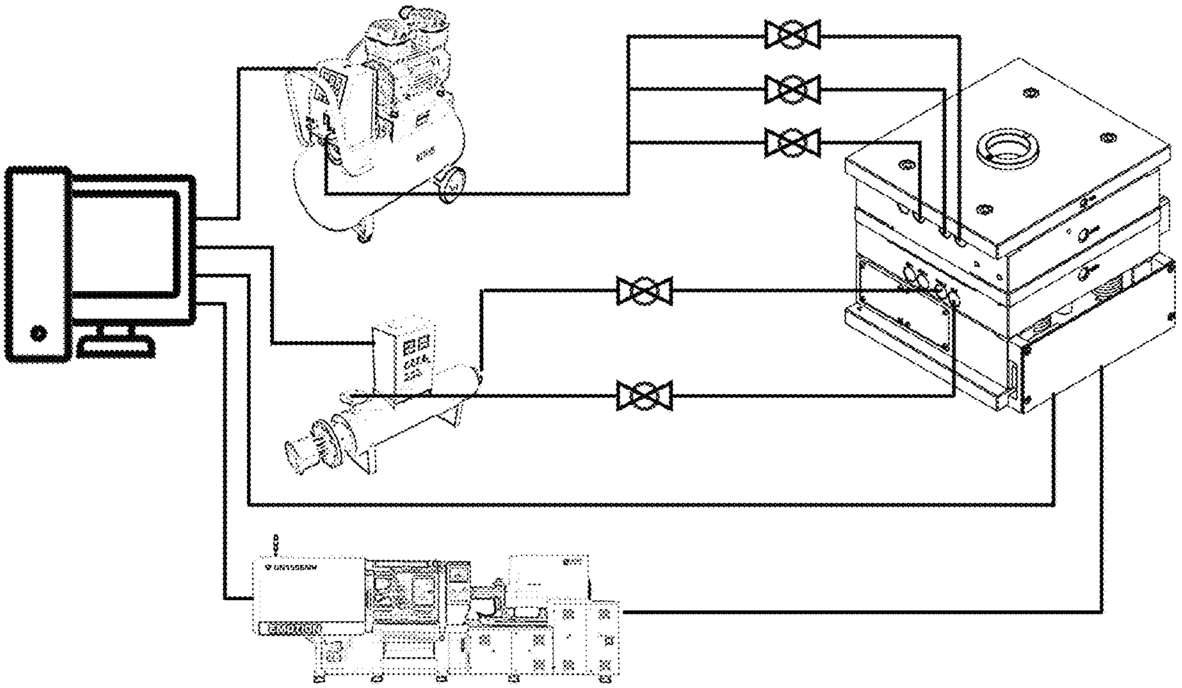
FIG. 9 is a schematic diagram of a molding system for high stretching of an in-mold decorative film.

As shown in FIG. 2, a cavity block 6 is fixed in the stationary mold 2. As shown in FIG. 5, the lower surface of the cavity block 6 is provided with a plurality of air holes 604 which are concentrically and annularly distributed, and the air holes 604 are funnel-shaped. As shown in FIG. 4, the upper surface of the cavity block 6 is provided with a first air pumping cavity 601, a second air pumping cavity 602 and a third air pumping cavity 603, and a plurality of air holes 604 are respectively communicated with the first air pumping cavity 601, the second air pumping cavity 602 and the third air pumping cavity 603. As shown in FIG. 3, the stationary mold 2 is provided with a first air pumping channel 201, a second air pumping channel 202 and a third air pumping channel 203 which communicate with the outside at the positions matched with the first air pumping cavity 601, the second air pumping cavity 602 and the third air pumping cavity 603. As shown in FIG. 9, these vacuum air pumping cavities communicate with the vacuum air pump outside the mold body through vacuum air pumping channels.

Figure 6:
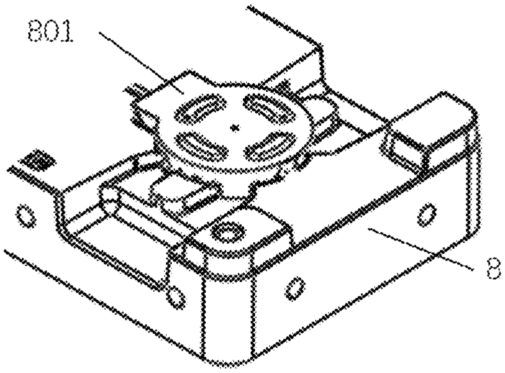
FIG. 6 is a detail view of the core block 8.
Figure 7:
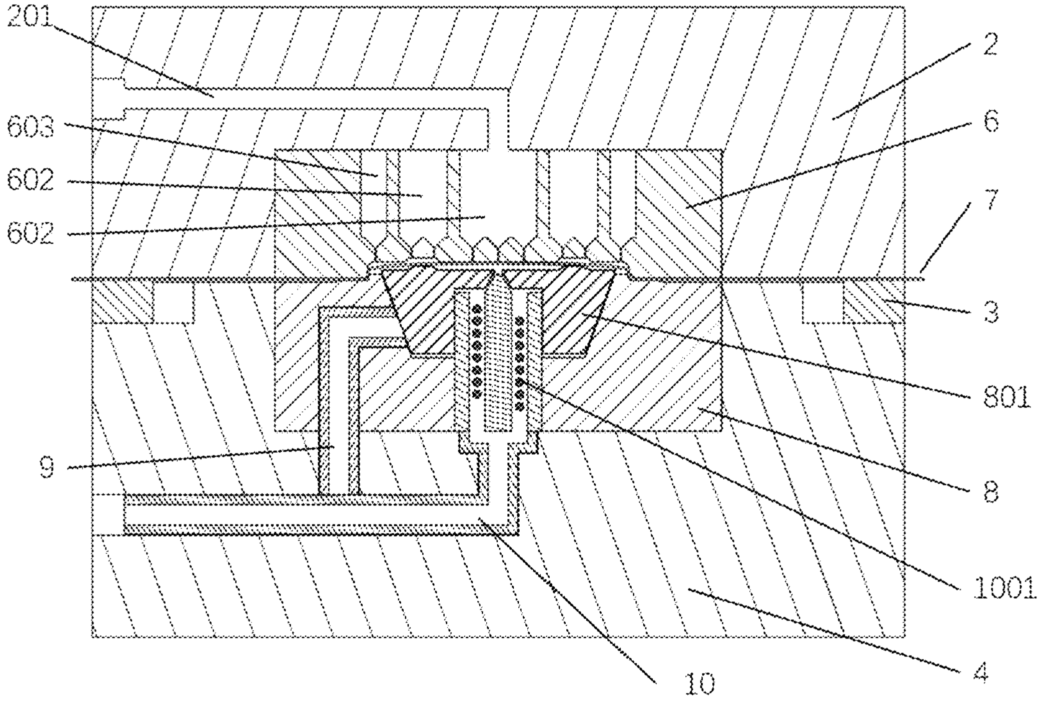
FIG. 7 is a sectional view of an assembly of a movable mold, a core block and a core ejection movable block.
Figure 8:
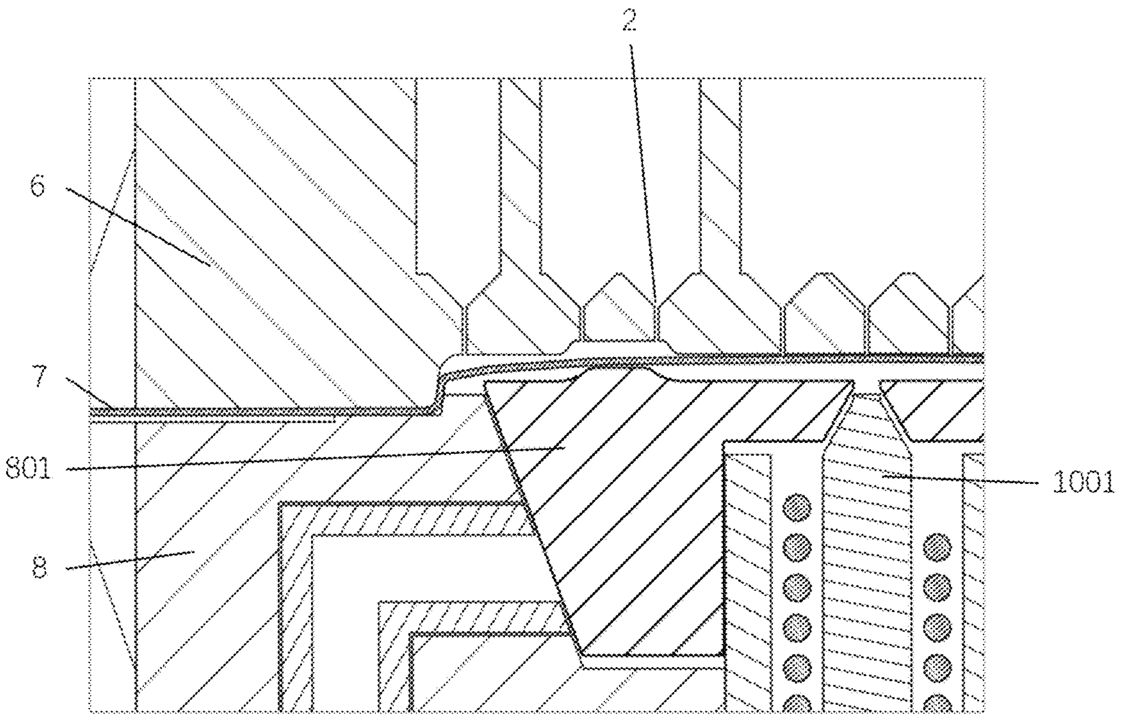
FIG. 8 is a sectional view of an assembly of a stationary mold, a cavity block, a movable mold, a core block and a core ejection movable block.

As shown in FIGS. 6-8, a core block 8 is fixed in the movable mold 4, and a core ejection movable block 801 is arranged in the core block 8. The core ejection movable block 801 is capable of moving up and down, and the limit of upward movement is to keep a distance from the cavity block 6 with the thickness of a film 7. As shown in FIG. 7, the core ejection movable block 801 and the movable mold 4 are provided with a heated air inlet channel 10 communicating with the outside, and the core block 8 and the movable mold 4 are provided with an air outlet channel 9 communicating with the outside; the heated air inlet channel 10 is communicated with the air outlet of the compressed air heater outside the mold body through a pipeline, and the air outlet channel 9 is communicated with the air inlet of the compressed air heater through a pipeline.

As shown in FIG. 7 and FIG. 8, a spiral heating wire 1001 is arranged in the heated air inlet channel 10, and temperature and pressure sensors are installed in both the heated air inlet channel 10 and the air outlet channel 9, so that the temperature and pressure in the duct can be monitored in real time and fed back to the operation interface of the external control terminal.

As shown in FIG. 8, the core ejection movable block 801 is in the shape of an inverted truncated cone, the matched core block 8 is provided with an inverted truncated cone groove, and the air outlet channel 9 is provided at the inverted truncated cone of the core 8. When the core ejection movable block 801 moves upward, a gap channel is formed between the edge of the core ejection movable block 801 and the core block 8, and the gap channel is communicated with the air outlet channel 9.

The center of the top of the core ejection movable block 801 is provided with a conical through hole, and the end of the heated air inlet channel 10 matched with it is conical. When the core ejection movable block 801 moves upward, a gap channel is formed between an inner side of the core ejection movable block 801 and a broken end of a terminal of the air heated air inlet channel 10, and the gap channel is communicated with the heated air inlet channel 10.

Figure 10:
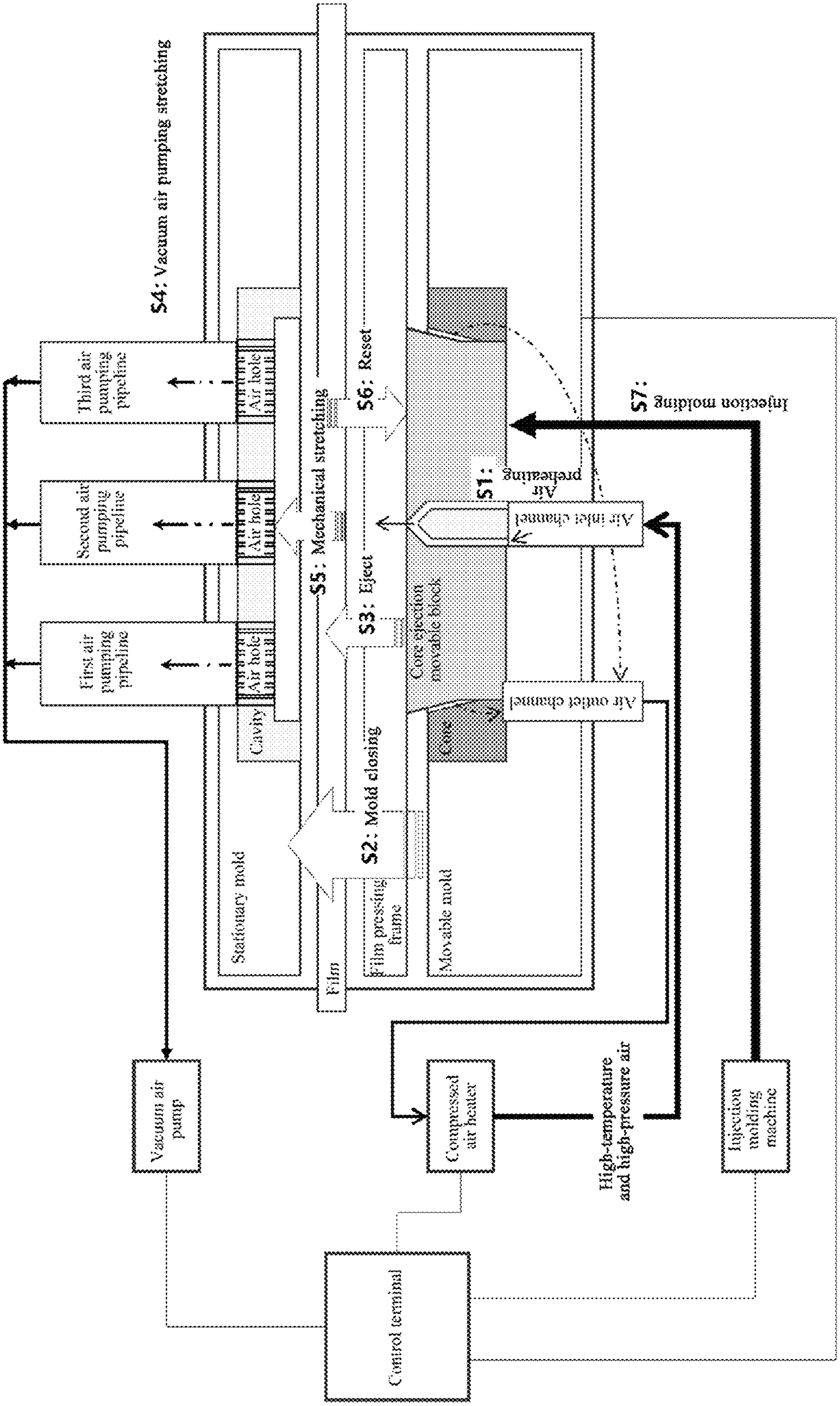
FIG. 10 is a schematic diagram of a molding method of a product mold for high stretching of an in-mold decorative film based on an embodiment of the present disclosure.

In another aspect of this embodiment, provided is a molding system for high stretching of an in-mold decorative film, as shown in FIGS. 9 and 10, including a control terminal, and a mold, a compressed air heater, a vacuum air pump and an injection molding machine connected with the control terminal. The mold is the above-mentioned mold for high stretching of an in-mold decorative film.

The control terminal is used to control the compressed air heater to inject heated air into the core ejection movable block, so as to heat, soften and preliminarily stretch the film; the vacuum air pump is controlled to pump out air from the gap between the cavity surface of the cavity block and the film; the movement of the mold is controlled and the film to be stretched is mechanically stretched; the injection molding machine is controlled for injection molding.

The molding method of the forming system includes the following steps:

S1, the movable mold 4 and the spiral heating wire 1001 in the heated air inlet channel 10 in the core ejection movable block 801 are preheated to a set temperature.

S2, the film pressing frame 3 is moved upwards to be attached to the stationary mold 2 to press the film 7 onto the stationary mold 2, and the movable mold 4 is moved to be attached to the film pressing frame 3.

S3, the core ejection movable block 801 in the movable mold 4 is ejected upwards, and the high-temperature and high-pressure air in the heated air inlet channel 10 is released onto the film 7; the high-temperature and high-pressure air bounced back from the film 7 flows out from the gap channel formed between the edge of the core ejection movable block 801 and the core block 6, and finally returns to the air inlet of the compressed air heater from the air outlet channel 9, so that the high-temperature air at the side of the movable mold 4 forms circulation, and the film 7 is rapidly heated and softened, and is preliminarily stretched; the control terminal being automatically adjusted to keep a pressure difference between the heated air inlet channel 10 and the air outlet channel 9.

S4, the vacuum air pump 12 exhausts the film 7 and the gap on the cavity surface through the vacuum air pumping channel, the vacuum air pumping cavity and the air holes 604 in the stationary mold, and the first air pumping cavity 601, the second air pumping cavity 602 and the third air pumping cavity 603 are sequentially communicated according to a set order to gradually stretch the film 7.

S5, the core ejection movable block 801 ejects to the film 7, pushes the film 7 which has been softened by heating to the cavity surface, and mechanically stretches the film 7.

S6, after ejecting to a stroke limit, the core ejection movable block 801 is reserved for a set time and then retreated; a whole retreating process is kept for a set time, and the control terminal automatically adjusts the pressure difference between the air inlet channel 10 and the air outlet channel 9 of the core, while maintaining the vacuum air pumping at the side of the cavity.

S7, the core ejection movable block 801 retreats to the original position, so as to close the heated air inlet channel and the air outlet channel; then, air pumping pipelines respectively connected with the first air pumping cavity 601, the second air pumping cavity 602 and the third air pumping cavity 603 are closed, and the injection molding machine starts injection molding.

It can be understood by those skilled in the art that the above is only a preferred example of the present disclosure, and it is not used to limit the present disclosure. Although the present disclosure has been described in detail with reference to the above examples, it is still possible for those skilled in the art to modify the technical solution described in the above examples or replace some technical features equally. Any modification and equivalent substitution within the spirit and principle of the present disclosure should be included in the scope of protection of the present disclosure.

What is claimed is:

1. A mold for high stretching of an in-mold decorative film, wherein the mold comprises an upper base, a stationary mold, a film pressing frame, a movable mold and a lower base which are sequentially arranged from top to bottom, and wherein the film pressing frame is capable of moving up and down, and a film to be stretched is provided between the film pressing frame and the stationary mold;

wherein a cavity block is fixedly provided in the stationary mold, a lower surface of the cavity block is provided with air holes and an upper surface of the cavity block is provided with a vacuum air pumping cavity, and the air holes are communicated with the vacuum air pumping cavity; and the stationary mold is provided with a vacuum air pumping channel communicated with an outside at a position matched with the vacuum air pumping cavity, and the vacuum air pumping cavity is communicated with a vacuum air pump outside a mold body through the vacuum air pumping channel;

wherein a core block is fixedly provided in the movable mold, and a core ejection movable block is provided in the core block; the core ejection movable block is capable of moving up and down, and a limit of upward movement is to keep a distance of a film thickness from the cavity block; the core ejection movable block and the movable mold are provided with heated air inlet channel communicated with the outside, and the core block and the movable mold are provided with air outlet channel communicated with the outside; and the heated air inlet channel is communicated with an air outlet of a compressed air heater outside the mold body through a pipeline, and the air outlet channel is communicated with an air inlet of the compressed air heater through a pipeline; and wherein the vacuum air pumping cavity arranged at the upper surface of the cavity block is annular nested, and sequentially comprises a first air pumping cavity, a second air pumping cavity and a third air pumping cavity from outside to inside; and the air holes arranged at the lower surface of the cavity block are funnel-shaped and distributed in multiple rings, and are communicated with the first air pumping cavity, the second air pumping cavity and the third air pumping cavity, respectively.

2. The mold for high stretching of the in-mold decorative film according to claim 1, wherein a spiral heating wire is provided in the heated air inlet channel, and temperature and pressure sensors are provided in both the heated air inlet channel and the air outlet channel, so that temperature and pressure in the heated air inlet channel and the air outlet channel is capable of being monitored in real time and fed back to an operation interface of an external control terminal.

3. The mold for high stretching of the in-mold decorative film according to claim 2, wherein a top end of the core ejection movable block is in a shape of an inverted truncated cone, and the core block matched with the core ejection movable block is provided with an inverted truncated cone groove, and the air outlet channel is arranged at the inverted truncated cone of a core, so that when the core ejection movable block moves upward, a gap channel is formed between an edge of the core ejection movable block and the core block, and the gap channel is communicated with the air outlet channel; and wherein a center of a top of the core ejection movable block is provided with a conical through hole, and an end of the heated air inlet channel matched with the core ejection movable block is conical, when the core ejection movable block moves upward, a gap channel is formed between an inner side of the core ejection movable block and a broken end of a terminal of the air heated air inlet channel, and the gap channel is communicated with the heated air inlet channel.

4. A molding system for high stretching of an in-mold decorative film, comprising a control terminal, and a mold, a compressed air heater, a vacuum air pump and an injection molding machine connected to the control terminal, wherein the mold is the mold for high stretching of the in-mold decorative film according to claim 1; and wherein the control terminal is configured to control the compressed air heater to inject heated air into a core ejection movable block to heat, soften and preliminarily stretch a film, control the vacuum air pump to pump out air from a cavity surface of the cavity block and the film, control the movement of the mold to mechanically stretch the film, and control the injection molding machine to perform injection molding.

* * * * *